(12) United States Patent
Ortet et al.

(10) Patent No.: US 12,107,504 B2
(45) Date of Patent: Oct. 1, 2024

(54) SYNCHRONIZATION OF AN ELECTRONIC DEVICE

(71) Applicant: STMicroelectronics (Rousset) SAS, Rousset (FR)

(72) Inventors: Sebastien Ortet, Chateauneuf-le-Rouge (FR); Vincent Binet, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 368 days.

(21) Appl. No.: 17/571,759

(22) Filed: Jan. 10, 2022

(65) Prior Publication Data

US 2022/0247318 A1    Aug. 4, 2022

(30) Foreign Application Priority Data

Jan. 29, 2021    (FR) ..................................... 2100872

(51) Int. Cl.
*H02M 3/158*    (2006.01)
*H02M 1/00*    (2006.01)

(52) U.S. Cl.
CPC ....... *H02M 3/1588* (2013.01); *H02M 1/0009* (2021.05)

(58) Field of Classification Search
CPC . H02M 3/1588; H02M 1/0009; H02M 1/0032
See application file for complete search history.

(56) References Cited

U.S. PATENT DOCUMENTS

| | | | |
|---|---|---|---|
| 9,036,377 B2 | 5/2015 | Chang et al. | |
| 9,356,506 B1 | 5/2016 | Ho | |
| 10,560,013 B2 | 2/2020 | Tirumala et al. | |
| 10,589,636 B2* | 3/2020 | Yamaguchi | H03K 17/56 |
| 10,848,297 B1 | 11/2020 | Ribeiro | |
| 10,892,684 B2 | 1/2021 | Wachi et al. | |
| 11,784,567 B2* | 10/2023 | Ortet | H02M 3/1566 |
| | | | 323/221 |
| 2011/0101946 A1 | 5/2011 | Nguyen | |
| 2013/0093490 A1 | 4/2013 | Kim et al. | |
| 2013/0294118 A1 | 11/2013 | So et al. | |
| 2015/0229212 A1 | 8/2015 | Shiwaya | |
| 2017/0201177 A1 | 7/2017 | Kesarwani et al. | |

OTHER PUBLICATIONS

Wang, P. et al., "A Current-Mode Buck Converter with Bandwidth Reconfigurable for Enhanced Efficiency and Improved Load Transient Response," IEEE Asian Solid-State Circuits Conference, Nov. 10-12, 2014, 4 pages.

* cited by examiner

*Primary Examiner* — Kyle J Moody
(74) *Attorney, Agent, or Firm* — Slater Matsil, LLP

(57) ABSTRACT

In an embodiment, a switching power supply includes: an output stage; a clock generator configured to generate a first clock signal; and a control circuit configured to control the output stage based on the first clock signal, wherein the switching power supply is configured to have a first operating mode synchronized by the first clock signal, and a second operating mode that is asynchronous, wherein the clock generator is configured to maintain the first clock signal at a constant value during the second operating mode.

21 Claims, 6 Drawing Sheets

SYNCHRONIZATION OF AN ELECTRONIC DEVICE

CROSS-REFERENCE TO RELATED APPLICATIONS

This application claims the priority benefit of French patent application number FR2100872, filed on "Jan. 29, 2021", and entitled "Synchronisation d'un dispositive électronique," which is hereby incorporated by reference to the maximum extent allowable by law.

This application is related to U.S. patent application Ser. No. 17/571,741, filed on the same day as this application, issued as U.S. patent Ser. No. 11/784,567 entitled "Synchronization of an Electronic Device," which claims the priority benefit of French patent application number "FR2100869", filed on Jan. 29, 2021, and entitled "Synchronisation d'un dispositif électronique," which applications are hereby incorporated herein by reference.

TECHNICAL FIELD

The present disclosure relates generally to an electronic system and method, and, in particular embodiments, to synchronization of an electronic device.

BACKGROUND

In a switching converter, a supply voltage of the converter is chopped by switching switches so as to implement phases of energy accumulation in an assembly comprising an inductive element and a capacitive element and phases of restitution, to a load connected to the output of the converter, of the energy accumulated in this assembly.

In order to implement the various operating phases of the converter, the switching converter comprises, for example, a circuit for generating a clock signal. The clock signal is, for example, a signal varying periodically between high and low levels corresponding respectively to high and low states of a binary signal.

SUMMARY

Some embodiments relate to the synchronization of electronic devices to a clock signal. Some embodiments relate to a power supply circuit comprising at least one switching power supply.

One embodiment provides a device comprising a switching power supply configured to have a first operating mode synchronized by a first clock signal generated by a first clock signal generating circuit and a second asynchronous operating mode, wherein the first generating circuit is configured to cause the first signal to become equal, upon a transition from the second operating mode to the first operating mode, to the signal having the closest rising edge among a second clock signal and a third clock signal complementary to the second clock signal.

Another embodiment provides a method for controlling a device comprising a switching power supply configured to have a first operating mode synchronized by a first clock signal generated by a first clock signal generating circuit and a second asynchronous operating mode, wherein the first signal becomes equal, upon a transition from the second operating mode to the first operating mode, to the signal having the closest rising edge among a second clock signal and a third clock signal complementary to the second clock signal.

According to one embodiment, the device comprises first and second transistors connected in series between a node for applying a supply voltage and a node for applying a reference voltage, the first and second transistors being connected to each other by an internal node, the first and second transistors being controlled by a second circuit for generating control signals for the first and second transistors.

According to one embodiment, the device comprises a capacitor connected between an output node of the switching power supply and the reference voltage application node and comprising an inductor connected between the internal node and the output node.

According to one embodiment, in the first operating mode, the first and second transistors are configured to alternate between on and off states periodically.

According to one embodiment, in the second operating mode, the second transistor is configured to be off state and the first transistor is configured to be open when the voltage on the output node is less than a setpoint voltage.

According to one embodiment, the device is configured to generate a fourth signal having a first value during the first operating mode and a second value during the second operating mode.

According to one embodiment, the first clock signal generating circuit comprises a third selection circuit configured to receive as input the second and third clock signals and having a control input connected to the output of a D flip-flop, the flip-flop being configured to receive, at a data input, the second clock signal and to receive, at a clock input, the fourth signal.

According to one embodiment, the first clock signal generating circuit comprises a fourth circuit configured to provide on an output the second clock signal, the output being coupled by an inverter circuit to one of the inputs of the third selection circuit.

According to one embodiment, the device comprising a comparator comparing the voltage of the internal node and the reference voltage, the fourth signal having the second value when the comparator determines that the voltage on the internal node is lower than the reference voltage.

Another embodiment provides a device comprising a switching power supply configured to have a first operating mode synchronized by a first clock signal generated by a first clock signal generating circuit and a second asynchronous operating mode, wherein the first generating circuit is configured so that the first signal is maintained at a constant value during the second operating mode.

Another embodiment provides a method for controlling a device comprising a switching power supply configured to have a first operating mode synchronized by a first clock signal generated by a first clock signal generating circuit and a second asynchronous operating mode, wherein the first generating circuit maintains the first signal at a constant value during the second operating mode.

According to one embodiment, the device comprises first and second transistors connected in series between a node for applying a first supply voltage and a node for applying a second reference voltage, the first and second transistors being connected to each other by an internal node, the first and second transistors being controlled by a second circuit for generating control signals for the first and second transistors.

According to one embodiment, the device comprises a first capacitor connected between an output node of the switching power supply and the node for applying the second reference voltage and comprising an inductor connected between the internal node and the output node.

According to one embodiment, in the first operating mode, the first and second transistors are configured to alternate between on and off states periodically.

According to one embodiment, in the second operating mode, the second transistor is configured to be off state and the first transistor is configured to be open when a third voltage on the output node is less than a fourth setpoint voltage.

According to one embodiment, the device is configured to generate a fourth signal having a first value during the first operating mode and a second value during the second operating mode.

According to one embodiment, the first circuit comprises: a first current source connected in series, between the first supply voltage application node and the second reference voltage application node, with a second capacitor; a first switch connected in parallel with the first capacitor; a second current source connected in series, between the first supply voltage application node and the second reference voltage application node, with a second switch and a third capacitor; and a third switch in parallel with an assembly comprising the third capacitor and the second switch.

According to one embodiment, the second switch is controlled by the fourth signal.

According to one embodiment, the first and third switches are configured to be in an on state during the second operating mode and to be in opposite states during the first operating mode.

According to one embodiment, the first and third switches are configured to receive substantially equal control signals during the second operating mode and to receive complementary control signals during the first operating mode.

According to one embodiment, the second switch and the third capacitor are connected by a middle node, the middle node being connected by a fourth switch to a node for applying a fifth voltage.

According to one embodiment, the fifth voltage is greater than or equal to the fourth setpoint voltage.

According to one embodiment, the fourth switch is configured to be controlled by a signal complementary to the fourth signal.

BRIEF DESCRIPTION OF THE DRAWINGS

The foregoing features and advantages, as well as others, will be described in detail in the following description of specific embodiments given by way of illustration and without limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may present the same references and may dispose of identical structural, dimensional, and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, for example the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Figure 1:
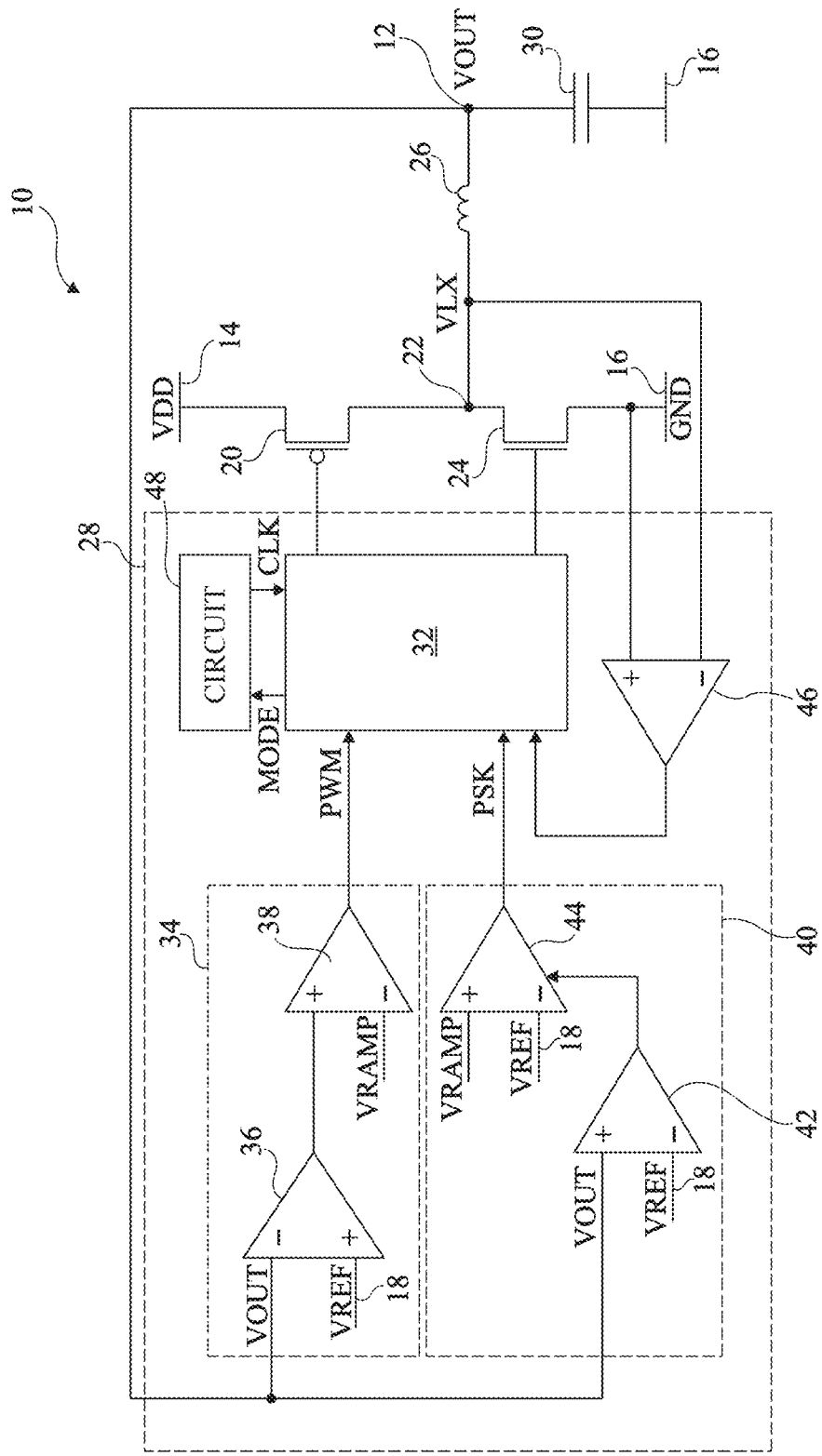
FIG. 1 shows an embodiment of an electronic device.

FIG. 1 represents one embodiment of an electronic device 10. The device 10 is a voltage converter. In this example, the converter 10 is a DC/DC converter, of the switching power supply type mode, which converts a DC supply voltage to a DC output voltage.

The converter 10 is configured to provide a DC output voltage VOUT. The converter comprises an output node 12, at which the voltage VOUT is available.

The converter 10 is supplied with a DC supply voltage VDD. The converter 10 is then connected between a first conductor rail, or node 14, connected to the voltage VDD, and a second conductor rail, or node 16, connected to a reference potential GND, for example ground.

The converter 10 is configured to provide the voltage VOUT at a value substantially equal to a setpoint value. To do so, the converter 10 receives, at an input node 18, a DC setpoint voltage VREF, for example referenced to the GND potential, the value of which is shown to be representative of the setpoint value of the voltage VOUT, preferably equal to the setpoint value of the voltage VOUT. In this example, the voltages VOUT, VDD and VREF are positive.

In this example, the converter 10 is a step-down or "buck" converter, i.e., the voltage VOUT setpoint is less than the voltage VDD setpoint. In other words, the value of the voltage VOUT is lower than the value of the voltage VDD. Some embodiments may be implemented in converters of other types, such as boost or buck-boost.

The converter 10 comprises a first MOS ("metal oxide semiconductor") transistor 20, preferably a PMOS (P-channel MOS transistor). The MOS transistor 20 is connected between the rail 14 and an internal node 22 to which a voltage VLX is applied. In other words, a first conduction terminal of the transistor 20, for example its source, is connected to the rail 14, with a second conduction terminal of the transistor 20, for example its drain, being connected to the node 22.

The converter 10 further comprises a second MOS transistor 24, preferably an NMOS transistor (N-channel MOS transistor). The transistor 24 is connected between the node 22 and the rail 16. In other words, a first conduction terminal of the transistor 24, for example its source, is connected to the rail 16, with a second conduction terminal of the transistor 24, for example its drain, being connected to the node 22.

Thus, transistors 20 and 24 are connected in series between rails 14 and 16 and are connected to each other at internal node 22.

The converter 10 comprises an inductive element or inductor 26. The inductor 26 is connected between node 22 and node 12.

The converter 10 comprises an output capacitor 30 connected between the node 12 and the rail 16. As an example, this capacitor is in the range of 2.2 µF to 20 µF or more. This output capacitor acts as a filter. In other words, this output capacitor of the converter smooths the current present at node 12 and stores the energy supplied to node 12 by the converter.

In operation, a load, not shown, is connected between node 12 and rail 16 so as to be powered by the voltage VOUT.

The converter 10 comprises a control circuit 28. The circuit 28 is configured to control the operation of the converter 10, so as to regulate the voltage VOUT, for example, so that its value is equal to the setpoint value VREF.

The converter 10 comprises two operating modes, a synchronous operating mode, and an asynchronous operating mode.

A first operating mode is called "Continuous Conduction Mode" (CCM), for example of the pulse width modulation (PWM) type, or pulse frequency modulation (PFM) type, in which each operating cycle of the converter comprises an energy accumulation phase in the inductor 26 and the capacitor 30 followed by an energy restitution phase to the load connected to the converter. During the energy accumulation phase, the current flowing through the inductive element 26 increases. During the energy restitution phase, the current flowing through the inductive element 26 decreases. This operating mode is a synchronous mode, synchronized by a binary clock signal CLK, for example at a frequency of 2.4 MHz. Such an operating mode is, for example, considered the normal operating mode of the converter.

In some embodiments, the signal CLK is a periodic signal such that, during a part of the period of the signal, for example half the period of the signal CLK, the signal CLK has a high value, and during the resto of the period, for example the other half of the period of the signal CLK, the signal CLK has a low value. The signal CLK has for example a duty cycle substantially equal, for example equal, to 50%.

A second operating mode is called "Pulse Skipping" (PSK) mode. In this operating mode, the transistor 24 is for example kept off and transistor 20 is turned on when the output voltage VOUT is lower than a reference voltage, for example the setpoint voltage VREF. Thus, an energy storage phase is implemented when the output voltage is lower than the setpoint voltage VREF. Such an operating mode is implemented, for example, when the current drawn by the load is low. This operating mode is an asynchronous operating mode.

The control circuit 28 comprises a circuit 32, for example a state machine, generating the control signals for the transistors 20 and 24. The circuit 32 thus comprises an output coupled, preferably connected, to the control terminal of the transistor 20, at which the control signal for the transistor 20 is provided. The circuit 32 further comprises an output coupled, preferably connected, to the control terminal of the transistor 24, at which the control signal of the transistor 24 is provided.

The circuit 32 further comprises an input connected to a control circuit 34 for the first operating mode, at which the circuit 32 receives a determinant signal PWM, according to the difference between the output voltage VOUT and the setpoint voltage VREF, the amplitude or frequency of the energy accumulation or energy restitution phases in the first operating mode. Thus, the signal PWM is used by the circuit 32 in the first operating mode and is, for example, unused during the second operating mode.

The circuit 34 comprises, for example, a comparator 36 configured to compare the output voltage VOUT to the setpoint voltage VREF. The comparator 36 comprises an input, preferably a non-inverting input, coupled, preferably connected, to the voltage VREF application node 18. The comparator 36 further comprises an input, preferably an inverting input, coupled, preferably connected, to the node 12. The comparator 36 comprises an output at which a signal is provided representing the difference between the voltage VOUT and the setpoint voltage VREF.

The circuit 34 comprises another comparator 38. The comparator 38 comprises an input, preferably a non-inverting input, coupled, preferably connected, to the output of comparator 36. The comparator 38 further comprises another input, preferably an inverting input, coupled, preferably connected, to a voltage ramp VRAMP application node. The comparator 38 comprises an output at which it provides the signal PWM. The output of the comparator is coupled, preferably connected, to one of the inputs of the circuit 32.

The circuit 32 further comprises an input coupled to a control circuit 40 for the second operating mode, on which the circuit 32 receives a signal PSK, depending on the difference between the output voltage VOUT and the setpoint voltage VREF, determines the instants, in the second operating mode of energy accumulation. In other words, for a first value of the signal PSK, obtained when the output voltage is lower than the setpoint voltage VREF, the transistor 20 is on so as to allow the capacitor 30 to be charged. For a second value of the signal PSK, the transistor 20 is turned off, the transistor 24 preferably being kept off state during the second operating mode. Thus, the signal PSK is used by the circuit 32 in the second operating mode and is, for example, unused during the first operating mode.

The circuit 40 comprises, for example, a comparator 42 configured to compare the output voltage VOUT to the setpoint voltage VREF. The comparator 42 comprises an input, preferably an inverting input, coupled, preferably connected, to the voltage VREF application node 18. The comparator 42 further comprises an input, preferably a non-inverting input, coupled, preferably connected, to node 12. The comparator 42 comprises an output at which a signal is provided representing the difference between the voltage VOUT and the setpoint voltage VREF.

The circuit 40 comprises another comparator 44. The comparator 44 comprises an input, preferably a non-inverting input, coupled, preferably connected, to a voltage ramp application node, for example the ramp VRAMP. The comparator 44 further comprises another input, preferably an inverting input, coupled, preferably connected, to the setpoint voltage VREF application node 18. The comparator 44 comprises a control input coupled, preferably connected, to the output of the comparator 42. The comparator 44 comprises an output at which the signal PSK is provided for a value of the output signal of the comparator 42. The output of the comparator is coupled, preferably connected, to one of the inputs of circuit 32.

Thus, when the converter 10 is in the first operating mode, the circuit 32 considers the signal PWM to determine the control signals for the transistors 20 and 24 and does not consider the signal PSK. When the converter 10 is in the second operating mode, the circuit 32 considers the signal PSK to determine the control signals for the transistors 20 and 24 and does not consider the signal PWM.

The circuit 28 further comprises a comparator 46. The comparator 46 comprises a first input, preferably a non-inverting input, coupled, preferably connected, to the voltage GND application node 16, and a second input, preferably an inverting input, coupled, preferably connected, to node 22. The comparator 46 comprises an output coupled, preferably connected, to the circuit 32, providing a signal representing the difference between the voltage VLX on the node 22 and the voltage on the node 16. In other words, the comparator 46 provides a signal to circuit 32 representing the sign of the voltage VLX. If the converter is operating in the first operating mode and the comparator determines that the voltage VLX is less than the voltage GND, the circuit 32 causes the converter to enter the second operating mode.

The circuit 28 further comprises a circuit 48 for generating the clock signal CLK. The circuit 28 thus comprises an output coupled, preferably connected, to the circuit 32 on which the CLK signal is provided.

The circuit 48 comprises an input coupled, preferably connected, to the circuit 32 on which a signal MODE is provided that is representing the operating mode of the converter. For example, the signal MODE takes a first value when the converter 10 is operating in the first operating mode and a second value when the converter 10 is operating in the second operating mode. Thus, the signal MODE takes on the second value when the converter changes from the first to the second operating mode, i.e., when the comparator 46 determines that the voltage VLX is lower than the voltage GND. For example, the signal MODE changes to the first value when the current drawn by the load increases significantly.

When the converter switches from the second operating mode to the first operating mode, the converter switches from an asynchronous mode to a synchronous mode. The circuit 48, and in particular circuit 32, must be resynchronized. The circuit 32 is synchronized to the rising or falling edges, preferably rising, of the clock signal CLK. When switching to the first operating mode, there may be a period of time between the change in value of the signal MODE and the next rising edge of the clock signal during which a large amount of energy is drawn by the load and the transistor 20 connecting the supply voltage application node and the node 22 is in off state. The capacitor 30 therefore discharges rapidly during this period, which can lead to a significant drop in the voltage supplying the load.

Figure 2:
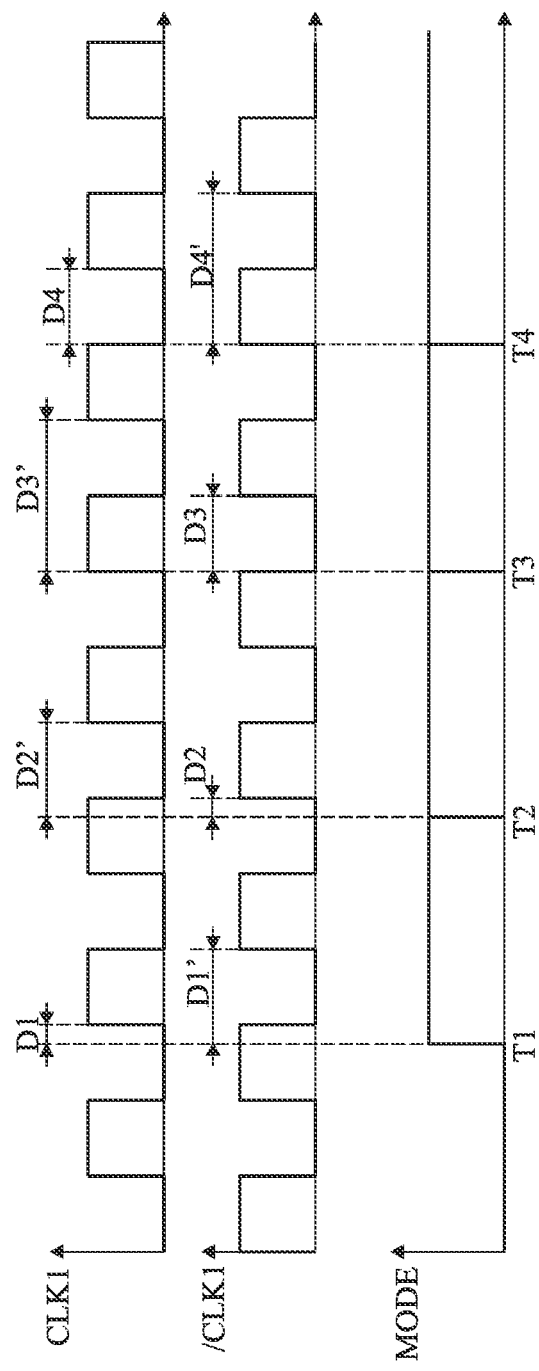
FIG. 2 is a set of timing diagrams illustrating the operation of one embodiment of a circuit for generating a clock signal.
Figure 3:
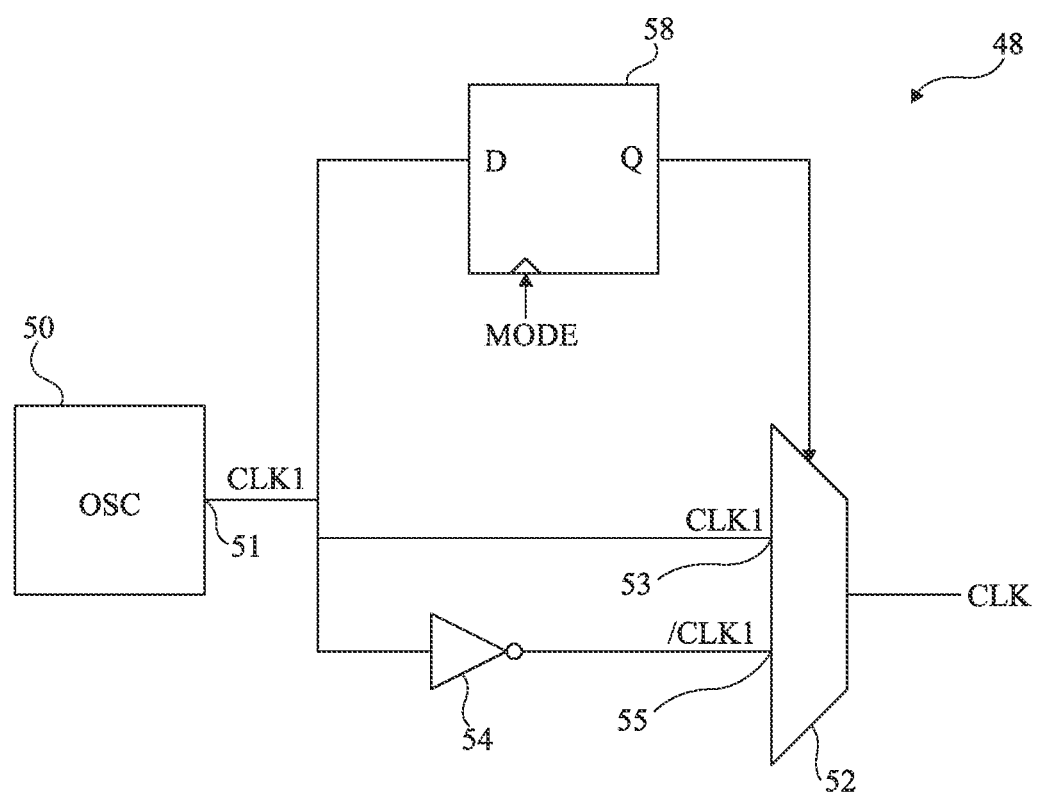
FIG. 3 shows schematically an example of the implementation of a circuit for generating a clock signal, the operation of which is described in FIG. 2.
Figure 4:
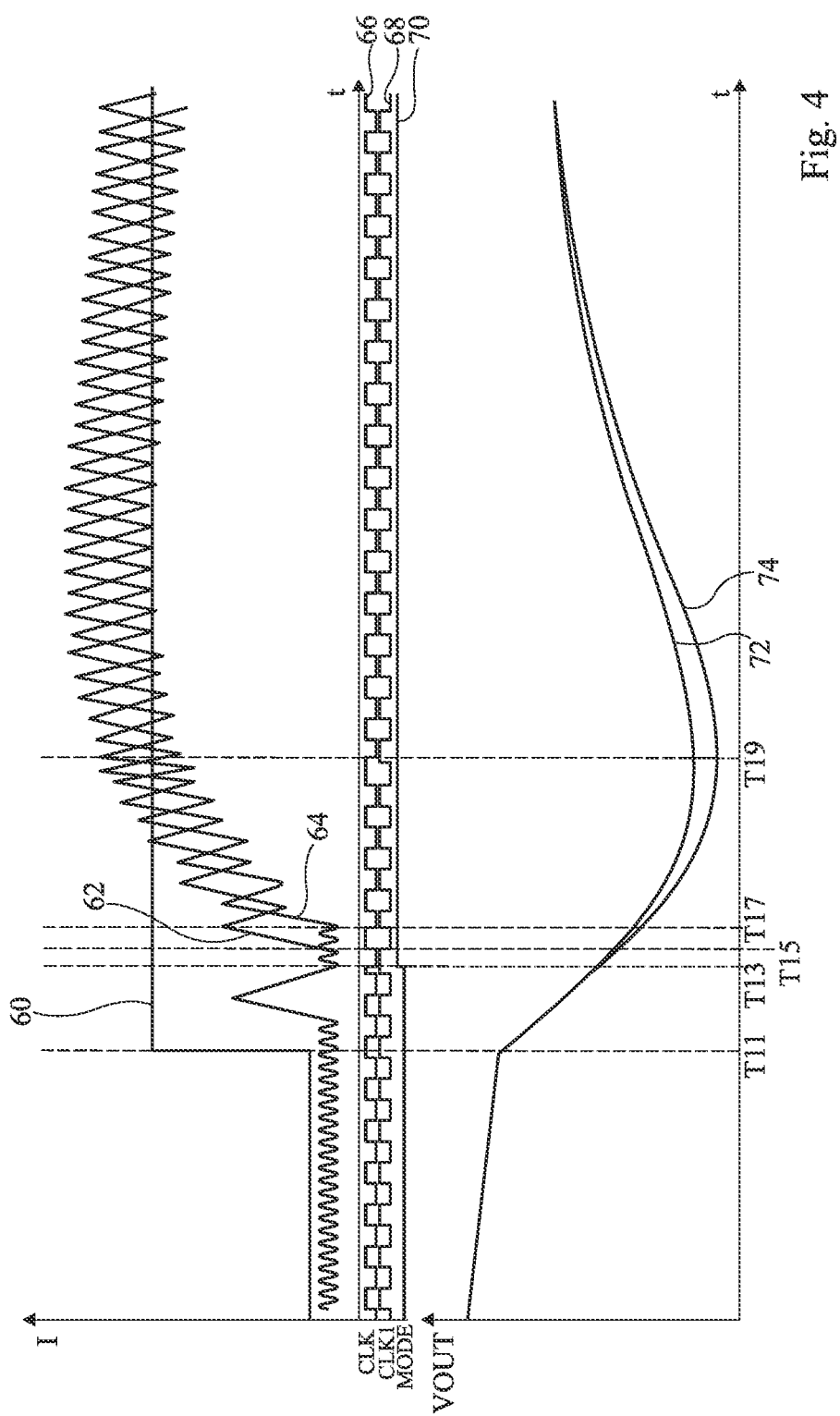
FIG. 4 is a set of timing diagrams illustrating the operation of the device of FIG. 1 comprising the embodiment of FIG. 3.

FIGS. 2, 3 and 4 illustrate one embodiment of a circuit for generating a clock signal dependent on the signal MODE, and thus dependent on the operating mode of the converter.

FIG. 2 is a set of timing diagrams illustrating the operation of one embodiment of a circuit for generating a clock signal 48. The circuit 48 is configured, in this embodiment, to provide, when switching from the second asynchronous operating mode to the first synchronous operating mode, one of a binary clock signal CLK1 and a clock signal complementary to the first clock signal CLK1, having the closest rising edge.

FIG. 2 comprises a timing diagram representing, as a function of time, the clock signal CLK1, generated for example by an oscillator included in circuit 48, a timing diagram representing, as a function of time, the complementary clock signal/CLK1, and a timing diagram representing, as a function of time, the signal MODE, and thus illustrating the operating mode of the converter.

FIG. 2 represents four distinct and independent cases of transition from the second operating mode to the first operating mode.

In the example of FIG. 2, a first value of the signal MODE, corresponding to the first operating mode, i.e. the synchronous operating mode, is a high value, and a second value of the signal MODE, corresponding to the second operating mode, i.e. the asynchronous operating mode, is a low value.

In a first case, the instant of switching from the second operating mode to the first operating mode is an instant T1. At instant T1, the signal MODE changes from the low value to the high value. In addition, at instant T1, the signal CLK1 has a low value and its complementary signal/CLK1 has a high value. The duration between the instant T1 and the closest rising edge of the signal CLK1 is a duration D1 and the duration between the instant T1 and the closest rising edge of the complementary signal/CLK1 of the signal CLK1 is a duration D1'. The duration D1 is shorter than the duration D1'. Thus, the clock signal CLK supplied by circuit 48 to circuit 32, and with which the converter is synchronized, is signal CLK1.

In a second case, the instant of transition from the second operating mode to the first operating mode is an instant T2. At instant T2, the signal MODE changes from the low value to the high value. In addition, at instant T2, the signal CLK1 has a high value and its complementary signal/CLK1 has a low value. The duration between the instant T2 and the closest rising edge of the signal CLK1 is a duration D2' and the duration between the instant T2 and the closest rising edge of the complementary signal/CLK1 of the signal CLK1 is a duration D2. The duration D2 is shorter than the duration D2'. Thus, the clock signal CLK supplied by circuit 48 to circuit 32, and with which the converter is synchronized, is the complementary signal of signal CLK1.

In a third case, the instant of transition from the second operating mode to the first operating mode is an instant T3. At instant T3, the signal MODE changes from the low value to the high value. Moreover, the instant T3 corresponds substantially to the rising edge of the signal CLK1 and the falling edge of the complementary signal/CLK1. The duration between the instant T3 and the next closest rising edge of the signal CLK1 is a duration D3' substantially equal to one period of the clock signal CLK1 and the duration between the instant T3 and the closest rising edge of the complementary signal/CLK1 of the signal CLK1 is a duration D3 corresponding to half a period of the clock signal CLK1. The duration D3 is shorter than the duration D3'. Thus, the clock signal CLK supplied by circuit 48 to circuit 32 and with which the converter is synchronized is the complementary signal/CLK1 of signal CLK1.

Similarly, in a fourth case, the instant of transition from the second operating mode to the first operating mode is an instant T4. At instant T4, the signal MODE changes from low to the high value. Moreover, the instant T4 corresponds substantially to the falling edge of the signal CLK1 and the rising edge of the complementary signal/CLK1. The duration between the instant T4 and the next closest rising edge of the signal CLK1 is a duration D4 substantially equal to one half of the period of the clock signal CLK1, and the duration between the instant T4 and the closest rising edge of the complementary signal/CLK1 of the signal CLK1 is a duration D4' corresponding to one period of the clock signal CLK1. The duration D4 is shorter than the duration D4'. Thus, the clock signal CLK supplied by circuit 48 to circuit 32 and with which the converter is synchronized is the signal CLK1.

When switching from the second asynchronous operating mode to the first synchronous operating mode, if the CLK1 signal has a low value, the closest rising edge is a rising edge of the CLK1 signal and if the CLK1 signal has a high value, the closest rising edge is a rising edge of the signal/CLK1.

In the worst cases, i.e. the third and fourth cases, the duration between the rising edge of the signal MODE, i.e. the transition between the second operating mode and the first operating mode, and the next rising edge of the CLK clock signal, in other words the duration during which the capacitor discharges, is equal to half a clock period.

One could have chosen to supply the signal CLK1 directly to circuit 32. However, in the worst case, the duration between the rising edge of the signal MODE and the next rising edge of the clock signal CLK could then be substantially equal to the entire period of the signal CLK1. This would be the case, for example, for the instant T3.

FIG. 3 shows schematically an example implementation of a circuit for generating a clock signal 48, the operation of which is described in FIG. 2.

The circuit 48 comprises a circuit 50 (OSC), for example an oscillator circuit, generating, on an output 51, the clock signal CLK1. The signal CLK1 is periodic, with a constant period. The signal CLK1 is preferably not changed during the first and second operating modes of the converter 10, and in particular is preferably not changed when switching from the first operating mode to the second operating mode or from the second operating mode to the first operating mode.

The circuit 48 comprises a selection circuit, or multiplexer, 52. The multiplexer 52 comprises an input 53 receiving the signal CLK1. The input 53 is thus coupled, preferably connected, to the output 51 of the circuit 50 on which the signal CLK1 is provided. The multiplexer 52 comprises an input 55 receiving the complementary signal/CLK1 of the signal CLK1. The input 55 is connected to the output 51 by an inverter circuit 54 generating at the output the complementary signal of the input signal. The circuit 54 comprises an input coupled, preferably connected, to the input 51 of the multiplexer 52 and an output coupled, preferably connected, to the input 55 of the multiplexer 52.

The circuit 48 further comprises a flip-flop 58, preferably a D flip-flop. The flip-flop 58 comprises a data input D coupled, preferably connected, to the node 51. The flip-flop further comprises a clock signal input coupled, preferably connected, to a signal MODE application node. The flip-flop 58 comprises an output Q coupled, preferably connected, to a control terminal of the multiplexer 52.

Thus, the input D continuously receives the clock signal CLK1. When switching from the second operating mode to the first operating mode, i.e., when the signal MODE has a rising edge, the output Q assumes the value of the signal CLK1 at that moment.

If the signal CLK1 has a low value, as in the first case of FIG. 2, the value of the output Q is a low value, for example the binary value '0'. The multiplexer is configured to output the signal CLK1 received on the input 53, when the control signal received on the control input has this low value.

Similarly, if the signal CLK1 has a high value, as is the case in the second case of FIG. 2, the output value Q is a high value, for example the binary value '1'. The multiplexer is configured to supply on output the signal, received on the input 55, complementary to the signal CLK1, when the control signal received on the control input has this high value.

Thus, the multiplexer is configured to output the signal CLK1 if the signal CLK1 has a low value on the rising edge of the signal MODE, and to output the complementary signal/CLK1 of the signal CLK1 if the signal CLK1 has a high value on the rising edge of the signal MODE.

FIG. 4 is a set of timing diagrams illustrating the operation of the device of FIG. 1 comprising the embodiment of FIG. 3. In particular, FIG. 4 includes a timing diagram illustrating currents (I):
  the current drawn by the load, by a curve 60;
  the current flowing through the inductor 26, in the embodiment of FIGS. 1 to 3, by a curve 62; and
  the current flowing through the inductor 26, in a converter similar to the converter 10 of FIG. 1, the signal CLK being equal to the signal CLK1 whatever the operating mode, by a curve 64.

FIG. 4 comprises a timing diagram illustrating binary signals:
  the signal CLK, by a curve 66;
  the signal CLK1, by a curve 68; and
  the signal MODE, by a curve 70.

FIG. 4 comprises a timing diagram illustrating voltages (VOUT):
  the voltage VOUT in the embodiment of FIGS. 1 to 3, by a curve 72; and
  the voltage VOUT in a converter similar to the converter 10 of FIG. 1, the signal CLK being equal to the signal CLK1 whatever the operating mode, by a curve 74.

At an instant T11, the load begins to draw a larger current than it did before the instant T11. In other words, at instant T11, the current drawn by the load (curve 60) changes from a low value to a high value. The output voltage VOUT starts to decrease more than before instant T11. At instant T11, the converter is still in the operating mode that the converter was in before instant T11, i.e. the asynchronous operating mode (PSK). The signal MODE has at instant T11 and before instant T11, a low value.

At an instant T13 after instant T11, the signal MODE takes a high value meaning that the converter will switch to the synchronous operating mode (PWM). This change is caused by the transition of the voltage VOUT under the value of the voltage VREF at the end of a mode PSK cycle.

Before instant T13, the signal CLK was equal to the signal CLK1. At instant T13, the signal CLK1 has a high value, so the closest edge is a falling edge of the signal CLK1, i.e. a rising edge of the complementary signal/CLK1of signal CLK1. The signal CLK thus becomes, as described above, equal to the complementary signal/CLK1 of the signal CLK1.

The first rising edge of the signal CLK after instant T13 occurs at instant T15. From instant T15, the average current flowing through the inductor 26 increases, so as to charge the capacitor 30 and supply the load. The voltage VOUT, represented by curve 72, decreases less significantly and then starts to increase when the current, represented by curve 62, reaches a sufficiently large value, the capacitor being charged.

At an instant T17, the first rising edge of the signal CLK1 after instant T13 occurs. In a case where the signal CLK remains equal to the signal CLK1, the instant T17 is the time at which the average current in the load starts to increase thanks to the transistors 20 and 24 which are then off and on alternately (mode PWM).

The behavior of the converter of the embodiment of FIGS. 2 and 3 from instant T15 is similar to the behavior of the converter wherein the signal CLK is the signal CLK1, from instant T17. However, instant T17 occurs half a period of the signal CLK1 after instant T15. The consequence of this delay is that the drop in the voltage VOUT occurring during the transition from the asynchronous to the synchronous operating mode is lower in the case of the converter of the embodiment of FIGS. 2 and 3 than in the case of the converter where the signal CLK is the signal CLK1. Indeed, at an instant T19, later than instants T15 and T17, the difference between curves 72 and 74 representing the voltage VOUT in these two cases, is, in this example, of the order of 5 mV, which corresponds approximately to 10% of the total voltage drop after instant T11.

Thus, one advantage of the embodiment of FIGS. 2 to 4 is that the maximum possible capacitor discharge time is half a period of the signal CLK1, i.e., half as long as in the case where the signal CLK1 is supplied directly to the circuit 32. Thus, the drop in voltage VOUT when switching from the second operating mode to the first operating mode is less than the drop in the case where signal CLK1 is supplied directly to circuit 32.

Figure 5:
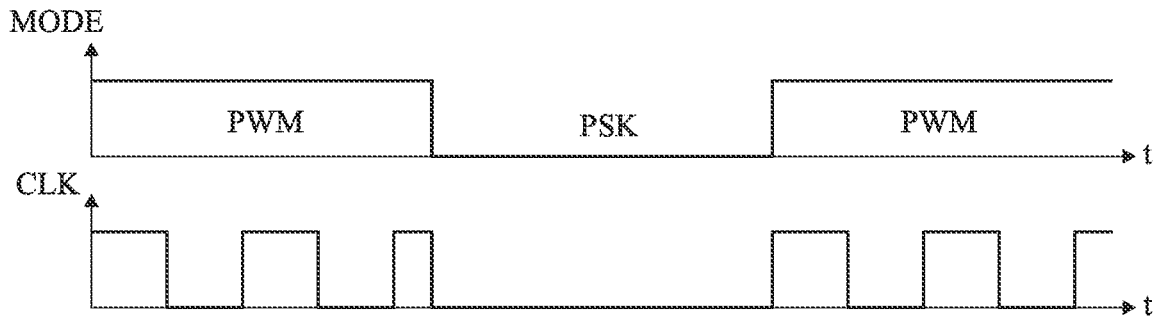
FIG. 5 is a set of timing diagrams illustrating the operation of another embodiment of a circuit for generating a clock signal.
Figure 6:
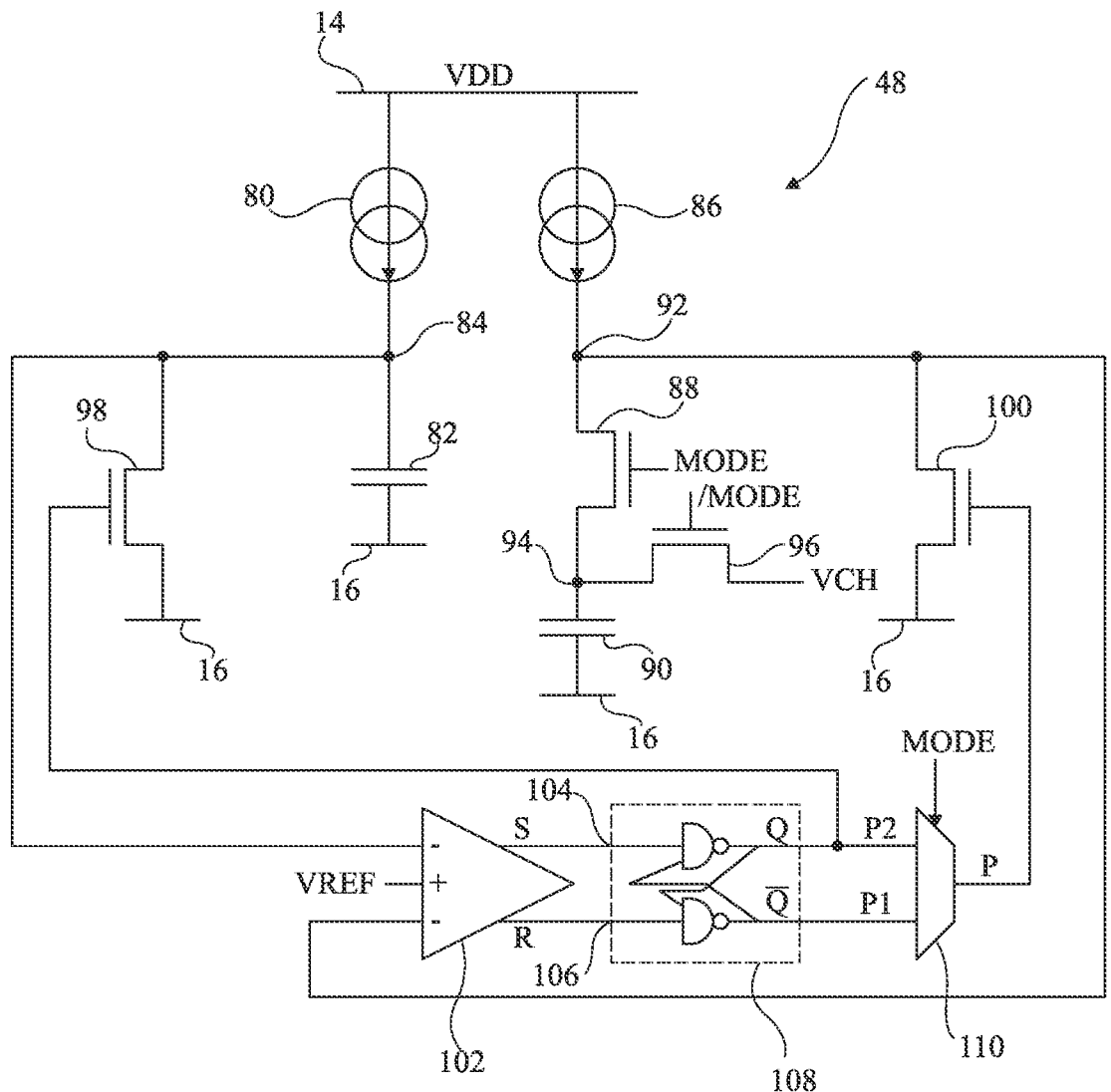
FIG. 6 shows schematically one embodiment of a clock signal generating circuit whose operation is described in FIG. 5.
Figure 7:
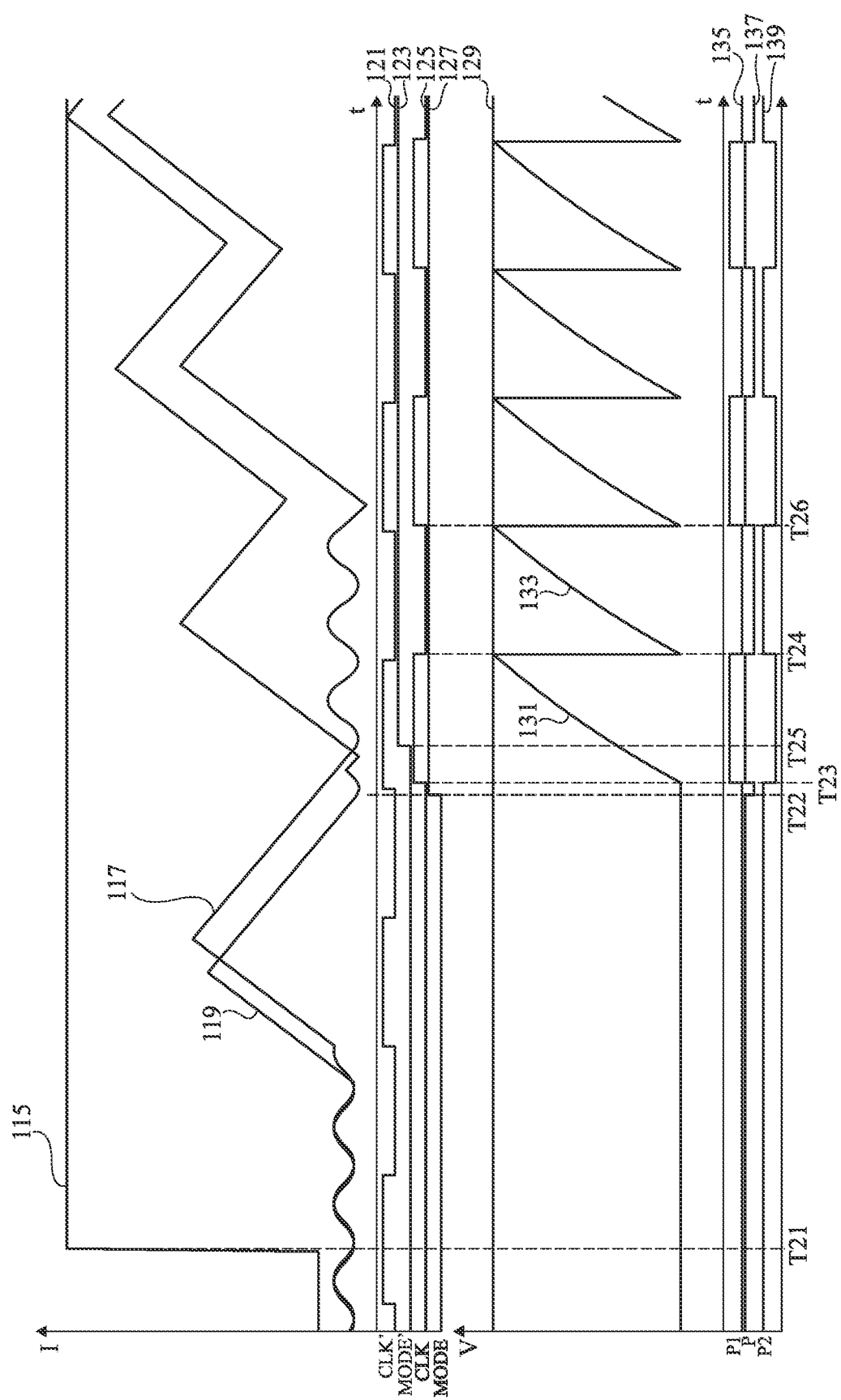
FIG. 7 is a set of timing diagrams illustrating the operation of the device of FIG. 1 comprising the embodiment of FIG. 6.

FIGS. 5, 6, and 7 illustrate another embodiment of a circuit for generating a clock signal dependent on the signal MODE, and thus dependent on the operating mode of the converter.

FIG. 5 is a set of timing diagrams illustrating the operation of another embodiment of a clock generation circuit 48.

FIG. 5 comprises a timing diagram illustrating, as a function of time (t), the signal MODE. FIG. 5 further comprises a timing diagram illustrating, as a function of time (t), the clock signal CLK supplied to circuit 32 by circuit 48.

FIG. 5 shows three phases of operation of the converter of FIG. 1. Specifically, FIG. 5 shows two synchronous phases (PWM) separated by an asynchronous phase (PSK).

During the first synchronous phase, the signal CLK alternates periodically between a high value and a low value. During the transition between the first synchronous phase and the asynchronous phase, i.e. when the signal MODE changes from a high value to a low value, the signal CLK assumes its low value, preferably a substantially zero value.

The transition between the asynchronous phase and the second synchronous phase, i.e. the moment when the signal MODE changes from a low value to a high value, corresponds to a rising edge of the signal CLK.

In other words, the signal CLK is maintained at a constant value, preferably the low value, during the asynchronous operating mode and resumes its periodicity, preferably by a rising edge, during transition to the synchronous mode.

FIG. 6 represents schematically an embodiment of a clock generation circuit 48 whose operation is described in FIG. 5.

The circuit 48 comprises a current source 80 coupled, preferably connected, in series with a capacitor 82 between a supply voltage application node, for example the voltage application node VDD 14, and a reference voltage application node, for example the voltage application node GND 16. Preferably, the source 80 comprises one terminal coupled, preferably connected, to node 14 and another terminal coupled, preferably connected, to a node 84. Preferably, the capacitor 82 comprises one terminal coupled, preferably connected, to node 84 and another terminal coupled, preferably connected, to node 16.

The circuit 48 further comprises another current source 86 coupled, preferably connected, in series with a switch 88, for example a transistor, and a capacitor 90 between a supply voltage application node, for example the voltage application node VDD 14, and a reference voltage application node, for example the voltage application node GND 16. Preferably, the source 86 comprises one terminal coupled, preferably connected, to the node 14 and another terminal coupled, preferably connected, to a node 92. Preferably, the switch comprises one terminal, for example, a conduction terminal, coupled, preferably connected, to node 92 and another terminal, for example a conduction terminal, coupled, preferably connected, to a node 94. Preferably, the capacitor 90 includes one terminal coupled, preferably connected, to node 94 and another terminal coupled, preferably connected, to node 16.

The assembly comprising the source 80 and capacitor 82 is thus connected in parallel with the assembly comprising the source 86, switch 88 and capacitor 90.

In addition, the circuit 48 preferably comprises a switch 96, for example a transistor, connected between the node 94 and a voltage application node VCH. More specifically, one terminal of the switch 96, for example a conduction terminal, is coupled, preferably connected, to the node 94 and another terminal, preferably a conduction terminal, is coupled, preferably connected, to the voltage application node VCH. The voltage VCH is preferably greater than or equal to the setpoint voltage VREF, for example greater than or equal to 0.8 V.

The transistors 88 and 96 are controlled by complementary signals. Thus, when one of the transistors 88 and 96 is off, the other is on. Preferably, one of the transistors 88 and 96 is controlled by the signal MODE, and the other is controlled by the signal/MODE, complementary to the signal MODE. Thus, a control terminal of the switch 88 is coupled, preferably connected, to an application node of the signal MODE and a control terminal of the switch 96 is coupled, preferably connected, to an application node of the signal/MODE.

The circuit 48 further comprises a switch 98, for example a transistor, connected between the node 84 and the node 14. More specifically, the switch 98 comprises one terminal, for example a conduction terminal, coupled, preferably connected, to the node 84 and another terminal, for example another conduction terminal, coupled, preferably connected, to the node 16. The switch 98 is thus connected in parallel with the capacitor 82. The switch 98 and the source 80 are thus connected in series between nodes 14 and 16.

Similarly, circuit 48 comprises a switch 100, for example a transistor, connected between node 92 and node 14. More specifically, the switch 100 comprises one terminal, for example a conduction terminal, coupled, preferably connected, to node 92 and another terminal, for example another conduction terminal, coupled, preferably connected, to node 16. The switch 100 is thus connected in parallel with the assembly comprising the capacitor 90 and the switch 88. The switch 100 and source 86 are thus connected in series between nodes 14 and 16.

During the asynchronous operating mode, the control signals for transistors 98 and 100 are signals complementary to each other. In other words, when transistor 98 is on, transistor 100 is off and vice versa.

The circuit 48 comprises a comparator circuit 102 configured to compare the voltage on node 84 to a reference voltage, preferably the setpoint voltage VREF, and to compare the voltage on node 92 to a reference voltage, preferably the same voltage compared to the voltage on node 84, preferably the voltage VREF.

The circuit 102 comprises an input, preferably an inverting input of a comparator, coupled, preferably connected, to the node 84. The circuit 102 comprises an input, preferably an inverting input of a comparator, coupled, preferably connected, to the node 92. The circuit 102 comprises an input, preferably an inverting input of a comparator, coupled, preferably connected, to a reference voltage application node. The circuit 102 comprises an output coupled, preferably connected, to a node 104 on which a signal S is provided representing the comparison between the voltage on the node 84 and the reference voltage. The circuit 102 comprises an output coupled, preferably connected, to a node 106 on which a signal R is provided representing the comparison between the voltage on the node 92 and the reference voltage.

The circuit 102 is connected at the output to an RS flip flop 108, for example formed by NAND logic gates. More specifically, the flip-flop 108 comprises a first input, preferably a so-called "Set" input, coupled, preferably connected, to node 104 and a second input, preferably a "Reset" input, connected to node 106. The flip-flop includes a first output called "Q" and a second output "Q". The first output provides the binary control signal P2 of the switch 98. Thus, the first output of the flip-flop 108 is coupled, preferably connected, to the control terminal of the transistor 98. The second output provides a signal P1 complementary to the signal P2.

In some embodiments, signal P1 may be the clock signal CLK provided to circuit 32.

The circuit 48 further comprises a selection circuit 110. The circuit 110 receives as input the signals P1 and P2 and provides as output a signal P for controlling the switch 100. More specifically, one input of circuit 110 is coupled, preferably connected, to the "Q" output of the flip-flop 108 and another input of circuit 110 is coupled, preferably connected, to the "Q". output of flip-flop 108. The output of the circuit 110 is coupled, preferably connected, to the control terminal of the switch 100.

The circuit 110 further comprises a control input receiving the signal MODE. The circuit 110 is configured to output the signal P1 if the signal MODE has a first value, preferably the high value, and to output the signal P2 if the MODE signal has the low value.

FIG. 7 is a set of timing diagrams illustrating the operation of the device of FIG. 1 comprising the embodiment of FIG. 6.

FIG. 7 comprises a timing diagram illustrating currents (I):
the current drawn by the load, shown as a curve 115;
the current flowing through the inductor 26 during operation of the embodiment of FIG. 6, shown as a curve 117; and
the current flowing through the inductor 26 in a converter similar to the converter of FIG. 1 in which the periodic, unmodified clock signal is supplied to the circuit 32 shown as a curve 119.

FIG. 7 comprises a timing diagram illustrating binary signals:

a clock signal CLK' supplied to circuit 32 in the converter corresponding to curve 119, shown as a curve 121;
a signal MODE' from the converter corresponding to curve 119, shown as a curve 123;
a clock signal CLK supplied to circuit 32 in the embodiment of FIG. 6, shown as a curve 125; and
the signal MODE of the embodiment of FIG. 6, shown as a curve 127.

FIG. 7 comprises a timing diagram illustrating voltages (V):
the voltage VREF, shown as a curve 129;
the voltage at node 84, shown as a curve 131; and
the voltage on node 92, shown as a curve 133.

FIG. 7 comprises a timing diagram illustrating binary signals:
signal P1, shown as a curve 135;
the P signal, shown as a curve 137; and
the P2 signal, shown as a curve 139.

At an instant T21, the load starts to draw a larger current than before the instant T21. In other words, at instant T21, the current drawn by the load (curve 115) changes from a low value to a high value. The instant T21 occurs while the device is operating in the asynchronous operating mode.

In the asynchronous operating mode, corresponding to a low value of the signal MODE, the signal CLK is maintained at a constant value, here a low value.

The signal P2, controlling the transistor 98, has a high value, keeping the transistor 98 on. Thus, the node 84 is connected to the node 16 by a conducting transistor and the voltage on the node 84 (curve 131) is substantially equal to the voltage on the node 16, i.e. 0 V, with the capacitor 82 discharging on the node 16.

In addition, the transistor 88 is off and the transistor 96 is on, these transistors being controlled by the signals MODE and/MODE respectively. The transistors 88 and 96 are thus in opposite states. Thus, node 94 is connected to the voltage VCH application node by a conducting transistor. In other words, the voltage across the capacitor 90 is the voltage VCH.

Since the signal MODE has a low value, the signal P takes the value of the signal P2, i.e. the high value. The transistor 100 is thus on and the capacitor discharges at the node 16. The voltage on the node 92 (curve 133) is substantially equal to the voltage on the node 16, i.e. 0 V.

Thus, in the asynchronous mode the control signals for transistors 98 and 100 are such that the transistors are on, preferably the control signals for transistors 98 and 100 are substantially equal.

At an instant T22, the voltage VLX (not shown in FIG. 7) on the node 22 becomes lower than the voltage on node 16, for example lower than 0 V. The value of the signal MODE then changes from low to high.

Thus, at the instant T22, the signal P takes the value of the signal P1, complementary to the signal P2, i.e. a low value. The transistor 100 is then in off state. Moreover, the transistor 88 becomes conducting and the transistor 96 becomes off. The voltage on node 92 is then substantially equal to the voltage VCH, close to the threshold of the transistor 88. The voltage on the node 92 increases until it reaches the value VREF, at an instant T23.

At the instant T23, the control signal of transistor 98, the signal P2, takes a low value and the control signal P, i.e. signal P1, takes a high value. Thus, the voltage on node 92 (curve 133) takes on substantially the value of the node 16 and the voltage on the node 84 (curve 131) increases, as the capacitor 84 is charged by source 80. The clock signal CLK thus takes, at the instant T23, a high value, which it maintains until an instant T24 at which the voltage on the node 84 reaches the value VREF.

The circuit 48 then alternates between first phases corresponding to a low state of the signal CLK during which:

the transistor 98 is on and the voltage on node 84 is substantially equal to 0 V; and the transistors 100 and 96 are in off state, the transistor 88 is on and the voltage on the node 92 increases until it reaches the value VREF, which leads to the transition to a second phase.

During the second phase, which corresponds to a high value of the signal CLK:

the transistor 98 is in off state and the voltage on the node 84 increases until it reaches the value VREF, causing the transition to the first phase; and the transistors 100 and 88 are on, the transistor 96 is in off state and the voltage on the node 92 is substantially equal to 0 V.

Thus, the duration between the transition from asynchronous mode to synchronous mode, i.e., the transition of the signal MODE from low to high value, and the first rising edge of the clock signal is the time between the instants T22 and T23. This duration is caused primarily by the time it takes for the voltage on the node 92 to reach the voltage on node 94 when the transistor 88 turns on. This time is relatively short, for example between 1 ns and 10 ns.

One could have chosen not to maintain the signal CLK at a constant value during the asynchronous operating mode. The curves 119, 125 and 127 correspond to such an example of a clock signal generation circuit. In this example, the circuit would not comprise the transistors 88 and 96 and no circuit no. The node 94 would in this example be connected to the node 92 and the transistor 100 would be controlled by the signal P1. The time between the transition from asynchronous to synchronous mode, i.e., the transition of the signal MODE' from the low value to the high value, and the first rising edge of the clock signal CLK' depends on the value of the signal CLK' when transitioning from asynchronous to synchronous mode and could be up to the value of the signal CLK' period. In the example shown in FIG. 7, this duration corresponds to the time between instants T25 and T26, which is much greater than the duration between instants T22 and T23.

An advantage of the embodiment of FIGS. 5 to 7 is that the voltage on the node 94 in asynchronous mode, i.e., the voltage VCH, is sufficiently close to the voltage VREF that the time required for the voltage on the node 92 to reach the value VREF is small and the first rising edge of the clock signal is close to the instant of transition from the asynchronous mode to the synchronous mode.

Another advantage of the embodiment in FIGS. 5 and 7 is that it only requires the addition of a few electronic components compared to most clock signal generation circuits.

Various embodiments and variants have been described. Those skilled in the art will understand that certain features of these embodiments can be combined and other variants will readily occur to those skilled in the art. In particular, in the described embodiments, the circuits are synchronized to the rising edges of the clock signals. It is obvious that the described embodiments are compatible with the circuits synchronized on falling edges, the modifications being within the reach of the person skilled in the art from the present description.

Finally, the practical implementation of the embodiments and variants described herein is within the capabilities of those skilled in the art based on the functional description provided hereinabove.

What is claimed is:

1. A switching power supply comprising:
an output stage;
a clock generator configured to generate a first clock signal, the clock generator comprising:
a first current source coupled in series with a first capacitor, the first current source and the first capacitor coupled between a supply terminal and a reference terminal,
a first switch coupled in parallel with the first capacitor,
a second current source coupled in series with a second switch and a third capacitor, the second current source, the second switch, and the third capacitor coupled between the supply terminal and the reference terminal, and
a third switch coupled in parallel with an assembly comprising the third capacitor and the second switch; and
a control circuit configured to control the output stage based on the first clock signal, wherein the switching power supply is configured to have a first operating mode synchronized by the first clock signal, and a second operating mode that is asynchronous, wherein the clock generator is configured to maintain the first clock signal at a constant value during the second operating mode.

2. The switching power supply of claim 1, wherein the control circuit is configured to generate a mode signal having a first value during the first operating mode and a second value during the second operating mode.

3. The switching power supply of claim 1, further comprising:
the supply terminal configured to receive a first supply voltage; and
the reference terminal configured to receive a reference voltage, wherein the output stage comprises first and second transistors, and wherein the control circuit is configured to control the first and second transistors.

4. The switching power supply of claim 3, wherein the first and second transistors are coupled in series between the supply terminal and the reference terminal, the first and second transistors being coupled to each other by a first intermediate node, the switching power supply further comprising:
an output terminal configured to provide an output voltage;
a first capacitor coupled between the output terminal and the reference terminal; and
an inductor coupled between the first intermediate node and the output terminal.

5. The switching power supply of claim 3, wherein, in the first operating mode, the control circuit is configured to control the first and second transistors to alternate between on and off states periodically.

6. The switching power supply of claim 3, wherein, in the second operating mode, the control circuit is configured to control the second transistor to be in off state and the first transistor to be open when an output voltage at an output terminal coupled to the output stage is lower than a setpoint voltage.

7. The switching power supply of claim 1, wherein the control circuit is configured to generate a mode signal having a first value during the first operating mode and a second value during the second operating mode, and wherein the second switch is configured to be controlled by the mode signal.

8. The switching power supply of claim 1, wherein the first and third switches are configured to be in an on state during the second operating mode and to be in opposite states during the first operating mode.

9. The switching power supply of claim 1, wherein the first and third switches are configured to receive substantially equal control signals during the second operating mode and to receive complementary control signals during the first operating mode.

10. The switching power supply of claim 1, further comprising a fourth switch coupled between a first intermediate node and a second intermediate node, the first intermediate node being coupled between the second switch and the third capacitor.

11. The switching power supply of claim 10, wherein the switching power supply is configured to provide an output voltage based on a setpoint voltage using the output stage, and wherein a voltage at the second intermediate node is greater than or equal to the setpoint voltage.

12. The switching power supply of claim 10, wherein the fourth switch is configured to be controlled by a signal complementary to the mode signal.

13. A method for controlling a switching power supply having first and second operating modes, the method comprising:
generating a first clock signal by a clock generator, the clock generator comprising:
a first current source coupled in series with a first capacitor, the first current source and the first capacitor coupled between a supply terminal and a reference terminal,
a first switch coupled in parallel with the first capacitor,
a second current source coupled in series with a second switch and a third capacitor, the second current source, second switch, and third capacitor coupled between the supply terminal and the reference terminal, and
a third switch coupled in parallel with an assembly comprising the third capacitor and the second switch;
controlling an output stage of the switching power supply based on the first clock signal, wherein the first operating mode is synchronized by the first clock signal, and the second operating mode is asynchronous; and
maintaining the first clock signal at a constant value during the second operating mode.

14. The method of claim 13, further comprising:
providing an output voltage to a load based on a setpoint voltage; and
in response to an increase in current drawn by the load, transitioning from the second operating mode to the first operating mode.

15. The method of claim 13, further comprising:
generating a mode signal having a first value during the first operating mode and a second value during the second operating mode;
controlling the second switch with the mode signal; and
controlling a fourth switch with a signal complementary to the mode signal, the fourth switch coupled between a first intermediate node and a second intermediate node, the first intermediate node being coupled between the second switch and the third capacitor.

16. The method of claim 15, further comprising receiving at the second intermediate node a voltage that is greater than or equal to the setpoint voltage.

17. A circuit comprising:
a supply terminal;
a reference terminal;
a clock generator configured to generate a first clock signal;
a first comparator having an input configured to be coupled to an output node of an output stage; and
a control circuit having a first input coupled to an output of the first comparator, a second input coupled to an output of the clock generator, and a first output configured to be coupled to a control terminal of the output stage, wherein the control circuit is configured to:
control the output stage to regulate an output voltage based on a setpoint voltage using a first operating mode synchronized by the first clock signal or a second operating mode that is asynchronous, and
generate a mode signal having a first value during the first operating mode and a second value during the second operating mode, wherein the clock generator comprises:
a first current source coupled in series with a first capacitor, the first current source and the first capacitor coupled between and the supply terminal and the reference terminal,
a first switch coupled in parallel with the first capacitor,
a second current source coupled in series with a second switch and a third capacitor, the second current source, second switch, and third capacitor coupled between the supply terminal and the reference terminal, the second switch comprising a control terminal configured to receive the mode signal, and
a third switch coupled in parallel with an assembly comprising the third capacitor and the second switch.

18. The circuit of claim 17, further comprising a second comparator having a first input coupled to a first intermediate node, a second input coupled to a second intermediate node, and a third input configured to receive the setpoint voltage, wherein the first intermediate node is coupled between the first current source and the first capacitor, and wherein the second intermediate node is coupled between the second current source and the second switch.

19. The circuit of claim 18, further comprising:
a flip-flop having an input coupled to the second comparator, a first output coupled to a control terminal of the first switch, and a second output that is complementary to the first output of the flip-flop; and
a multiplexer having a first input coupled to the first output of the flip-flop, a second input coupled to the second output of the flip-flop, an output coupled to a control terminal of the third switch, and a control terminal configured to receive the mode signal.

20. The circuit of claim 17, wherein the clock generator further comprises a fourth switch coupled between a first intermediate node and a second intermediate node, the first intermediate node being coupled between the second switch and the third capacitor.

21. The circuit of claim 20, wherein the fourth switch is configured to be controlled by a signal complementary to the mode signal.

* * * * *